US008300931B2

(12) United States Patent
Lee (10) Patent No.: US 8,300,931 B2
(45) Date of Patent: Oct. 30, 2012

(54) NON-LINEAR TONE MAPPING APPARATUS AND METHOD AND COMPUTER READABLE MEDIUM STORED THEREON COMPUTER EXECUTABLE INSTRUCTIONS FOR PERFORMING THE METHOD (75) Inventor: Young-Sin Lee, Seoul (KR)

(73) Assignee: Core Logic, Inc., Seoul (KR)

( * ) Notice: Subject to any disclaimer, the term of this patent is extended or adjusted under 35 U.S.C. 154(b) by 910 days.

(21) Appl. No.: 12/215,306

(22) Filed: Jun. 26, 2008

(65) Prior Publication Data
US 2009/0003697 A1 Jan. 1, 2009

(30) Foreign Application Priority Data
Jun. 27, 2007 (KR) ........................ 10-2007-0063503

(51) Int. Cl.
G06K 9/00 (2006.01)
(52) U.S. Cl. ........................................ 382/167; 358/523
(58) Field of Classification Search .......... 382/162–167; 358/518–532
See application file for complete search history.

(56) References Cited

U.S. PATENT DOCUMENTS

| 6,266,103 | B1 * | 7/2001 | Barton et al. | 348/675 |
| 6,717,698 | B1 * | 4/2004 | Lee | 358/1.9 |
| 7,283,662 | B1 * | 10/2007 | Hamburg | 382/162 |
| 7,567,705 | B1 * | 7/2009 | Hamburg | 382/162 |
| 7,692,666 | B1 * | 4/2010 | Bourgoin et al. | 345/601 |
| 2005/0134705 | A1 | 6/2005 | Kim et al. | |
| 2005/0169555 | A1 * | 8/2005 | Hasegawa | 382/284 |
| 2007/0047033 | A1 * | 3/2007 | Furui | 358/519 |
| 2007/0269132 | A1 * | 11/2007 | Duan et al. | 382/274 |
| 2008/0025635 | A1 * | 1/2008 | Han et al. | 382/274 |
| 2008/0199074 | A1 * | 8/2008 | Mitsunaga | 382/169 |
| 2009/0128578 | A1 * | 5/2009 | Feng | 345/600 |

FOREIGN PATENT DOCUMENTS

| JP | 10-164396 | 6/1998 |
| JP | 10-215385 | 8/1998 |
| JP | 2004-222024 | 8/2004 |
| KR | 10-2004-0048791 | 6/2004 |

OTHER PUBLICATIONS

McReynolds, T. et al., "Advanced Graphics Programming Using OpenGL," Elsevier Inc., pp. 35-40, 242-245, 354-355 (2005).

(Continued)

Primary Examiner — Jingge Wu
(74) Attorney, Agent, or Firm — Nath, Goldberg & Meyer; Joshua B. Goldberg; Jerald L. Meyer (57) ABSTRACT The present invention provides non-linear tone mapping apparatus and method and a computer readable medium stored thereon computer executable instructions for performing the method. The non-linear tone mapping apparatus according to the present invention comprises a luminance value computing unit for computing a luminance value of each pixel of an object image using an image information of each pixel; a computing unit for computing a light adaptive value of each pixel using the image information and luminance value of each pixel, the light adaptive value representing the degree of response to brightness of the image in the image information of each pixel; and a converting unit for converting the image information of each pixel of the object image using a ratio of the image information of each pixel to the light adaptive value.

17 Claims, 4 Drawing Sheets

OTHER PUBLICATIONS

Reinhard et al., "Dynamic Range Reduction Inspired by Photoreceptor Physiology" Jan. 1, 2005, pp. 13-24.

Li Tao and Vijayan K. Asari, "Adaptive and Integrated Neiborhood-Dependent Approach for Nonlinear Enhancement of Color Image" Dec. 12, 2005, pp. 1-14.

Ledda P et al., "A Local Model of Eye Adaption for High Dynamic Range Images" Nov. 3, 2004, pp. 151-160.

K. Devlin, "A Review of Tone Reproduction Techniques" Nov. 5, 2002.

Function RGBIde=tonemap(RGBHDR, varagin).

* cited by examiner

NON-LINEAR TONE MAPPING APPARATUS AND METHOD AND COMPUTER READABLE MEDIUM STORED THEREON COMPUTER EXECUTABLE INSTRUCTIONS FOR PERFORMING THE METHOD

CLAIM OF PRIORITY

This application claims priority under 35 USC §119(a) to Korean Patent Application No. 10-2007-0063503, filed on Jun. 27, 2007, in the Korean Intellectual Property Office, the entire contents of which are hereby incorporated by reference.

TECHNICAL FIELD

The present invention relates to apparatus and method for correcting a low luminous intensity area of an input image, and in particular, to apparatus and method for providing a converted image having higher visual perception according to human visual perception system.

BACKGROUND

With increasing interest in digital image processing, various image processing technologies, apparatus or techniques are suggested. The image processing is utilized in various industries to improve the human visual perception.

The image processing includes feature extraction, image enhancement, image restoration, image reconstruction, image analysis, image recognition or image compression. The image processing employs techniques appropriate for its objects mentioned above.

In the case that an image of an object is taken under limited conditions such as a physical limitation of an image pickup device, characteristic of the object or various external environments where the object is located, the effects of the limited conditions are reflected on the resultant image.

A method for correcting a luminous intensity of an area of an image is used to address the above-mentioned image enhancement problem. To reflect an actual appearance of an object to increase human perception to the resultant image of the object, various methods are suggested, for example histogram stretching, gamma correction, algebra conversion or compulsory adjustment of brightness coefficient value.

Among the conventional methods, stretching in image processing is represented by the following Equation 1.

$$g(x, y) = \left( \frac{f(x, y) - g_{min}}{g_{max} - g_{min}} \right) \times 255 \quad \text{Equation 1}$$

In the Equation 1, $g(x,y)$ is a stretched image information, $f(x,y)$ is an original image information, $g_{max}$ is a maximum value of a pixel, and $g_{min}$ is a minimum value of a pixel. The stretching is a technique for processing an image by the above-mentioned equation, and adjusts to stretch a pixel value distribution of an image having a low contrast more widely.

And, the gamma correction or algebra conversion uses a specific function such as an exponential function or a log function, in which an original image information is an independent variable and a function value of the function is a dependent variable, and the function value corresponds to the resultant image.

However, the above-mentioned techniques do not take into account the characteristic of the entire image based on human perception to brightness of the image, and uses a method for uniformly changing brightness information of the image by conversion to increase the luminous intensity of a low luminous intensity area.

In this case, a dark area may be expressed as a bright area, however the brightness and color of the entire image is changed, or the brightness and the color of the original image is considerably influenced by distortion of image information such as color twist of a specific area.

SUMMARY

The present invention was devised to solve the above-mentioned problems. An object of the present invention is to provide an apparatus and a method, which corrects a low luminous intensity area by matching brightness of the low luminous intensity area with an equal or similar level to an image information value of a bright image, thereby overcoming error in color information and making the brightness gradation of an entire image natural.

Another object of the present invention is to provide a computer readable medium stored thereon computer executable instructions for performing the above-mentioned method.

These and other features, aspects, and advantages of the present invention will be more fully described in the preferred embodiments of the present invention. And, the objects and advantages of the present invention can be implemented by configurations recited in the claims singularly or in combination.

To achieve the above-mentioned objects, a non-linear tone mapping apparatus according to the present invention comprises a luminance value computing unit for computing a luminance value of each pixel of an object image using an image information of each pixel; a computing unit for computing a light adaptive value of each pixel using the image information and luminance value of each pixel, the light adaptive value representing the degree of response to brightness of the image in the image information of each pixel; and a converting unit for converting the image information of each pixel of the object image using a ratio of the image information to the light adaptive value for each pixel.

And, the computing unit may include a luminance adaptive value computing unit for computing a luminance adaptive value of each pixel using the image information of each pixel and the luminance value of each pixel; a global luminance adaptive value computing unit for computing a global luminance adaptive value of the object image using a statistical computation value of the image information and a statistical computation value of the luminance value; and a light adaptive value computing unit for computing a light adaptive value corresponding to the image information of each pixel using the luminance adaptive value of each pixel and the global luminance adaptive value.

Further, the non-linear tone mapping apparatus further comprises a normalization unit for normalizing the image information of each pixel of the object image; and a denormalization unit for denormalizing the image information of each pixel converted by the converting unit, and the computing unit may be configured to compute a luminance value using the image information of each pixel normalized by the normalization unit.

Meanwhile, to achieve the above-mentioned objects, a non-linear tone mapping method comprises a luminance value computing step of computing a luminance value of each pixel of an object image using an image information of each pixel; a light adaptive value computing step of computing a light adaptive value of each pixel using the image information and luminance value of each pixel, the light adaptive value representing the degree of response to brightness of the image in the image information of each pixel; and a converting step of converting the image information of each pixel of the object image using a ratio of the image information to the light adaptive value for each pixel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

DETAILED DESCRIPTION

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Generally, a color space of an image, essential to image processing may be expressed variously, for example RGB (Red, Green, Blue), CMYK (Cyan, Magenta, Yellow, Key (Black)), HS-family, CIE (The Commission Internationale d'Eclairage) or Y-family, according to point of view such as view toward color mixture or similarity to human vision system, and may be converted to another kind of color space by a simple mathematical conversion formula.

And, an input image includes a plurality of pixels, and each pixel has its unique image information (brightness, hue, saturation and so on). Generally, the image information has values of 0 to 255 and is indicated as information of 8 bit. However, in alternative embodiments, the image information may be indicated as information of 10 bit or 12 bit depending on application conditions.

Therefore, it should be understood that a color space coordinate system used as an example in the present invention may be applicable to another color space coordinate equally or similarly, and a bit size of an image information of a pixel in the input image is just an example of the present invention for description.

Figure 1:
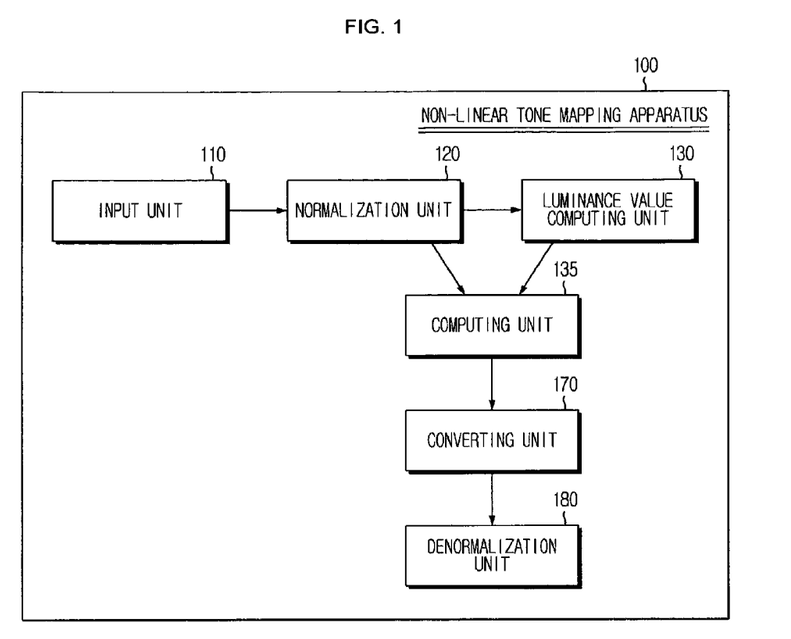
FIG. 1 is a block diagram illustrating a non-linear tone mapping apparatus according to a preferred embodiment of the present invention.
Figure 2:
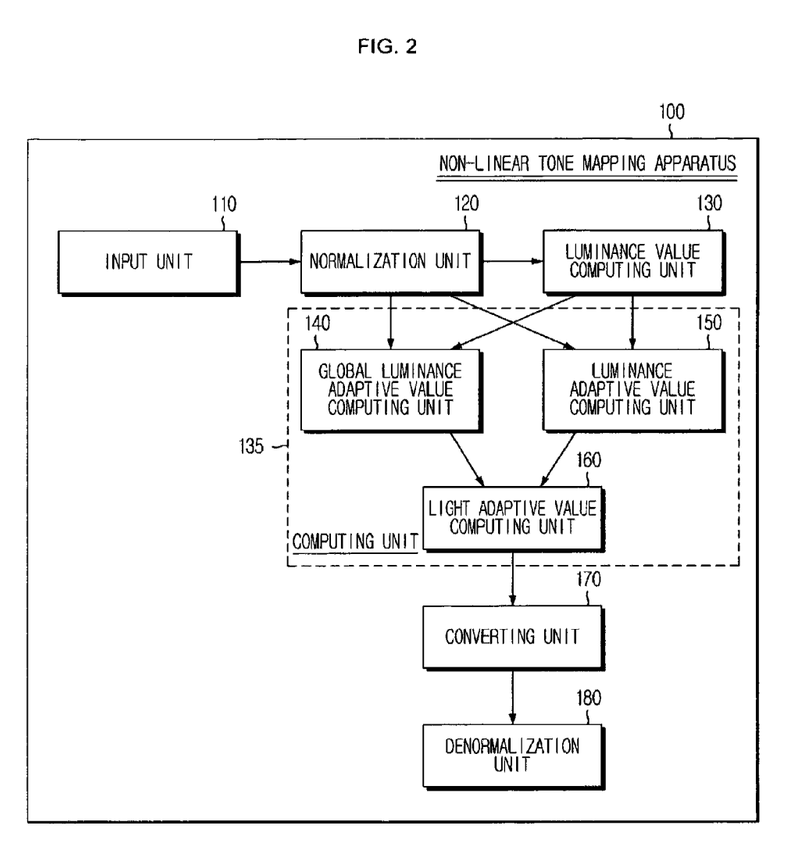
FIG. 2 is a block diagram illustrating a non-linear tone mapping apparatus according to another embodiment of the present invention.
Figure 3:
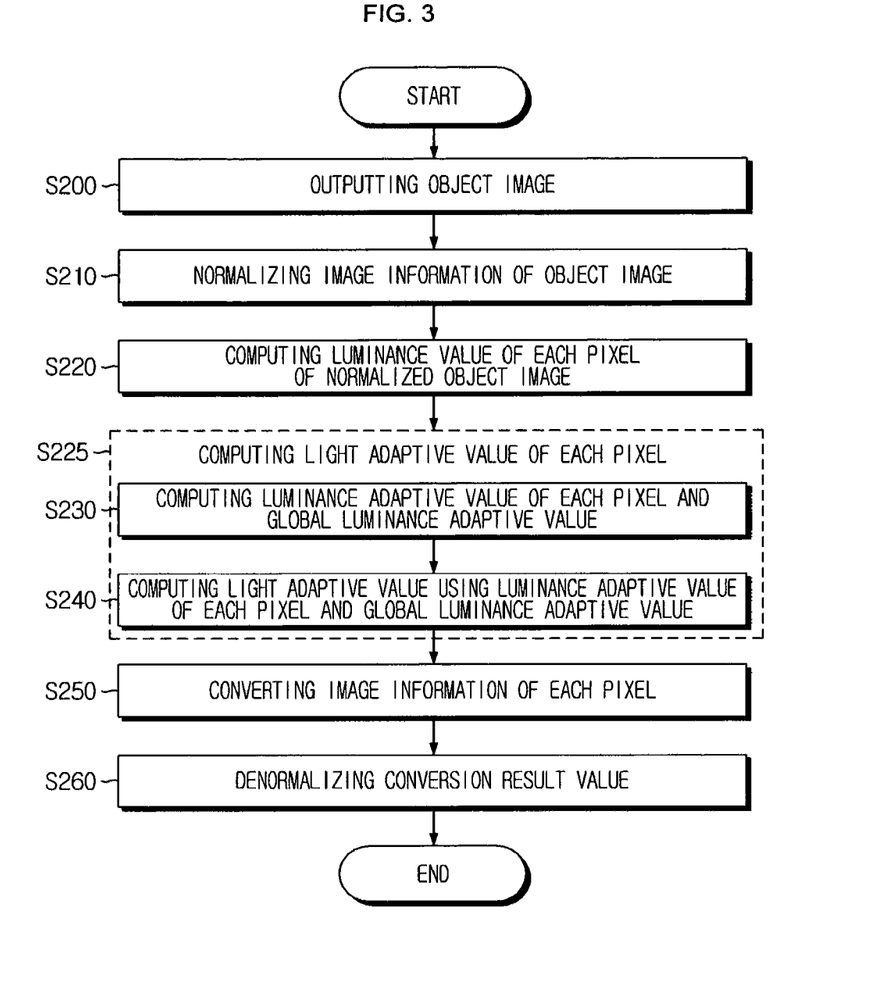
FIG. 3 is a flow chart illustrating a non-linear tone mapping method according to a preferred embodiment of the present invention.

FIG. 1 is a block diagram illustrating a non-linear tone mapping apparatus according to a preferred embodiment of the present invention. FIG. 2 is a block diagram illustrating a non-linear tone mapping apparatus according to another embodiment of the present invention. FIG. 3 is a flow chart illustrating a non-linear tone mapping method according to a preferred embodiment of the present invention. Referring to FIGS. 1 to 3, a non-linear tone mapping apparatus 100 according to the present invention comprises an input unit 110, a normalization unit 120, a luminance value computing unit 130, a computing unit 135, a converting unit 170 and a denormalization unit 180.

The input unit 110 receives an input object image for conversion (S200), and serves as an interface for transmitting the input object image to another configuration of the present invention.

Prior to describing a configuration of the present invention in detail, the human vision system used to correct an image information of a low luminous intensity area is described briefly.

The term, 'adaptation' means adjusting the condition of the human visual system to increase the visual perception to an object, variable according to amount of light incident upon the human eye and power spectral distribution of the light.

Luminance (brightness) adaptation includes light adaptation and dark adaptation. The light adaptation means that in the case of a sudden movement to higher luminance, the eye becomes dark-adapted through decreases of the sensitivity. The dark adaptation means that in the case of a sudden movement to lower luminance, the eye becomes light-adapted through increases of the sensitivity.

And, color adaptation or chromatic adaptation means that the sensitivity of three kinds of cones changes according to spectral composition of an illuminating light and light on an object, and spectral sensitivity of the human visual system changes accordingly. Thus, the human eye sees color uniformly. Through color adaptation, the human eye controls the change of color caused by change of a light source to perceive the color as original.

The present invention corrects a low luminous intensity area based on light and mechanism of human visual perception to allow a more natural image correction without distortion of image information.

The normalization unit 120 according to the present invention normalizes an image information of each pixel of the object image inputted through the input unit 110 (S210). In alternative embodiments, normalization may be not performed, and in this case, the object image inputted through the input unit 110 is inputted into the luminance value computing unit 130. This embodiment uses the normalized image information, however alternative embodiments may use an image information that is not passed through normalization.

Normalization maps a statistical sample value that may have various values to a value between 0 and 1. Typically, the normalized value is expressed as (function value−min)/(max−min).

All statistical values are normalized between 0 and 1 by the above-mentioned mathematical expression. Normalization adjusts all input variables to be calculated within a predetermined range, thereby increasing calculation efficiency.

For convenience of description, a 3×3 object image shown in the following Table 1 is taken as an example.

TABLE 1

| | | |
|---|---|---|
| $(R_{11}, G_{11}, B_{11})$ | $(R_{12}, G_{12}, B_{12})$ | $(R_{13}, G_{13}, B_{13})$ |
| $(R_{21}, G_{21}, B_{21})$ | $(R_{22}, G_{22}, B_{22})$ | $(R_{23}, G_{23}, B_{23})$ |
| $(R_{31}, G_{31}, B_{31})$ | $(R_{32}, G_{32}, B_{32})$ | $(R_{33}, G_{33}, B_{33})$ |

The object image has an image information expressed as RGB for each pixel. However, as mentioned above, it is obvious that the image information may be expressed as various color spaces.

The normalization unit 120 normalizes an image information of each pixel of the object image shown in the above Table 1 using a mathematical formula such as (image information value−min)/(max−min). The following Table 2 shows the normalized image information that is expressed as "I".

TABLE 2

| | | |
|---|---|---|
| $I_{r11}, I_{g11}, I_{b11}$ | $I_{r12}, I_{g12}, I_{b12}$ | $I_{r13}, I_{g13}, I_{b13}$ |
| $I_{r21}, I_{g21}, I_{b21}$ | $I_{r22}, I_{g22}, I_{b22}$ | $I_{r23}, I_{g23}, I_{b23}$ |
| $I_{r31}, I_{g31}, I_{b31}$ | $I_{r32}, I_{g32}, I_{b32}$ | $I_{r33}, I_{g33}, I_{b33}$ |

The normalized image information is inputted into the luminance value computing unit 130. The luminance value computing unit 130 computes a luminance value of each pixel using the normalized image information of each pixel of the object image (S220).

Preferably, a method for computing a luminance value using the normalized image information uses the following Equation 2.

$$L = A \times Ir + B \times Ig + C \times Ib \qquad \text{Equation 2}$$

In the Equation 2, L is a luminance value of each pixel, and Ir, Ig, and Ib are normalized image information for each R, G and B of each pixel and has a value between 0 and 1. A, B and C are weight constants of the image information, A is a user input constant set between 0.15 and 0.20, B is a user input constant set between 0.65 and 0.75, and C is a user input constant set between 0.05 and 0.15.

That is, preferably a weight value for an image information of GREEN among the normalized image information is reflected the most highly, for example about 70%. The luminance value of green, the color that the human eye feels most comfortable with, is assigned the highest weight. A preferred luminance computation equation obtained through an experimental example is $L = 0.2125 Ir + 0.7154 Ig + 0.0721 Ib$.

The luminance value may be set as an average value of RGB image information, however preferably the luminance value uses a coefficient value in such a form that a visual receptor of human actually receives by the above equation.

And, the user input constant may be provided by another module in the apparatus, or may be directly inputted by an operator such as a user through an external interface.

The luminance value computed for each pixel is shown in the following Table 3.

TABLE 3

| | | |
|---|---|---|
| $L_{11}$ | $L_{12}$ | $L_{13}$ |
| $L_{21}$ | $L_{22}$ | $L_{23}$ |
| $L_{31}$ | $L_{32}$ | $L_{33}$ |

The computing unit 135 computes a light adaptive value representing the degree of response to brightness of the image in the image information of each pixel using the luminance value of each pixel computed by the luminance value computing unit 130 and the image information of each pixel (S225).

As mentioned above, to eliminate a one-to-one pixel conversion by applying a function having a linear property, a light adaptive value on which the degree of response of human vision system to brightness of the image is reflected, is computed as a factor. The computed light adaptive value is inputted into the converting unit 170 later and is used as a standard for pixel conversion.

The above-mentioned method allows image conversion appropriate for a mechanism of human visual perception. In the case that an image conversion is performed using different light adaptive values for each pixel, a specific correction value for brightness such as luminance of each pixel can be computed.

The light adaptive value computed by the above-mentioned method uses statistical values of luminance for the whole brightness of the object image to compute an accurate light correction value in harmony with all the pixels of the object image. For this purpose, the computing unit 135 according to a preferred embodiment of the present invention may include a global luminance adaptive value computing unit 140, a luminance adaptive value computing unit 150 and a light adaptive value computing unit 160.

The luminance adaptive value computing unit 150 computes a luminance adaptive value of each pixel using the image information of each pixel and the luminance value of each pixel (S230).

The luminance adaptive value indicates the degree of relation between the image information of each pixel and the luminance value of each pixel, and reflects chromatic adaptation. The luminance adaptive value is computed using a value obtained by applying weight values to the normalized image information of each pixel and the luminance value of each pixel, with the sum of the weight values being 1.

Specifically, the luminance adaptive value computed by the luminance adaptive value computing unit 150 is represented by the following Equation 3.

$$I_a^{local} = b I_{r/g/b} + (1-b)L \qquad \text{Equation 3}$$

In the Equation 3, $I_a^{local}$ is a luminance adaptive value of each pixel, b is a user input constant between 0 and 1, L is a luminance value, and $I_{r/g/b}$ is normalized R, G, B image information of each pixel.

In the case that b is 0, a luminance adaptive value of a corresponding pixel is a luminance value of the pixel itself. In the case that b is 1, a luminance adaptive value of a corresponding pixel is a channel image information value of the pixel. The constant 'b' is a user input value that reflects the degree of chromatic adaptation in the above-mentioned range.

The luminance adaptive value computed by the Equation 3 is shown in the following Table 4.

TABLE 4

| $I_a^{local}(R_{11}), I_a^{local}(G_{11}), I_a^{local}(B_{11})$ | $I_a^{local}(R_{12}), I_a^{local}(G_{12}), I_a^{local}(B_{12})$ | $I_a^{local}(R_{13}), I_a^{local}(G_{13}), I_a^{local}(B_{13})$ |
|---|---|---|
| $I_a^{local}(R_{21}), I_a^{local}(G_{21}), I_a^{local}(B_{21})$ | $I_a^{local}(R_{22}), I_a^{local}(G_{22}), I_a^{local}(B_{22})$ | $I_a^{local}(R_{23}), I_a^{local}(G_{23}), I_a^{local}(B_{23})$ |
| $I_a^{local}(R_{31}), I_a^{local}(G_{31}), I_a^{local}(B_{31})$ | $I_a^{local}(R_{32}), I_a^{local}(G_{32}), I_a^{local}(B_{32})$ | $I_a^{local}(R_{33}), I_a^{local}(G_{33}), I_a^{local}(B_{33})$ |

As shown in the Table 4, the luminance adaptive value is computed for each channel (RGB) of each pixel. That is, in the case of a 3×3 matrix, 9 pixels exist and each pixel has 3 (RGB) image information, and thus 27 local luminance adaptive values are computed.

And, the global luminance adaptive value computing unit 140 of the present invention computes a global luminance adaptive value of the object image using a statistical computation value of the image information and a statistical computation value of the luminance value or using a value obtained by applying weight values to a statistical computation value of the normalized image information of each pixel and a statistical computation value of the luminance value of each pixel, with the sum of the weight values being 1 (S230).

As mentioned above, the luminance adaptive value indicates the degree of relation between the image information for each channel of each pixel and the luminance value, and reflects chromatic adaptation. The global luminance adaptive value means the statistical value of all the pixels, and is not computed by unit of pixel. The global luminance adaptive value reflects statistical and general chromatic adaptation of all the pixels.

Therefore, the global luminance adaptive value uses a statistical computation value of the image information and a statistical computation value of the luminance value, and preferably is computed by the following Equation 4.

$$I_a^{global} = c I_{r|g|b}^{av} + (1-c) L^{av} \quad \text{Equation 4}$$

In the Equation 4, $I_a^{global}$ is a global luminance adaptive value, $I_{r|g|b}^{av}$ is a statistical computation value of the normalized R, G, B image information of each pixel, and $L^{av}$ is a statistical computation value of the luminance value, and c is a user input constant between 0 and 1.

The statistical computation value may be one of various statistical computation values representing a statistical property of the image information and the luminance value. However, preferably a statistical average value, i.e. an average value of the image information of each pixel and an average value of the luminance value of each pixel is used, thereby reflecting an algebraically general value.

The global luminance adaptive value computed by the global luminance adaptive value computing unit 140 is shown in the following Table 5.

TABLE 5

| AVERAGE VALUE OF LUMINANCE, $L^{av}$ | $(L_{11} + L_{12} + L_{13} + \ldots + L_{32} + L_{33})/9$ |
|---|---|
| $I_r^{av}$ | $(I_{r11} + I_{r12} + I_{r13} + I_{r21} + I_{r22} + I_{r23} + I_{r31} + I_{r32} + I_{r33})/9$ |
| $I_g^{av}$ | $(I_{g11} + I_{g12} + I_{g13} + \ldots + I_{g31} + I_{g32} + I_{g33})/9$ |
| $I_b^{av}$ | $(I_{b11} + I_{b12} + I_{b13} + \ldots + I_{b31} + I_{b32} + I_{b33})/9$ |
| GLOBAL LUMINANCE ADAPTIVE VALUE | $I_a^{global}(r), I_a^{global}(g), I_a^{global}(b)$ |

As shown in the Table 5, the global luminance adaptive value is computed for each channel information, and thus 3 global luminance adaptive values are computed.

After the luminance adaptive value of each pixel and the global luminance adaptive value are computed, the light adaptive value computing unit 160 computes a light adaptive value corresponding to the image information of each pixel using the luminance adaptive value of each pixel and the global luminance adaptive value (S240).

The light adaptive value indicates the relation between the luminance adaptive value of each pixel and the global luminance adaptive value of the object pixel, and thus changes together with the whole characteristic of the image in the case of change of the image information.

That is, the light adaptive value is computed using a value obtained by applying weight values to the luminance adaptive value of each pixel and the global luminance adaptive value, with the weight values being 1. Specifically, the light adaptive value is computed by the following Equation 5.

$$I_a = d I_a^{local} + (1-d) I_a^{gobal} \quad \text{Equation 5}$$

In the Equation 5, Ia is a light adaptive value, $I_a^{local}$ is a luminance adaptive value of each pixel, $I_a^{global}$ is a global luminance adaptive value, and d is a user input constant between 0 and 1.

As shown in the Table 4, the number of luminance adaptive values, $I_a^{local}$, of all the pixels is 27 (R: 9, G: 9, B: 9), and as shown in the Table 5, the number of global luminance adaptive values, $I_a^{global}$ is 3 (R, G, B).

Therefore, the number of light adaptive values is 27, and the computed light adaptive values are shown in the following Table 6.

TABLE 6

| $Ia_{r11}, Ia_{g11}, Ia_{b11}$ | $Ia_{r12}, Ia_{g12}, Ia_{b12}$ | $Ia_{r13}, Ia_{g13}, Ia_{b13}$ |
|---|---|---|
| $Ia_{r21}, Ia_{g21}, Ia_{b21}$ | $Ia_{r22}, Ia_{g22}, Ia_{b22}$ | $Ia_{r23}, Ia_{g23}, Ia_{b23}$ |
| $Ia_{r31}, Ia_{g31}, Ia_{b31}$ | $Ia_{r23}, Ia_{g23}, Ia_{b23}$ | $Ia_{r33}, Ia_{g33}, Ia_{b33}$ |

After the light adaptive value is computed, the converting unit 170 according to the present invention converts the image information of each pixel using a ratio of the image information of each pixel to the light adaptive value of each pixel (S250).

As mentioned above, the light adaptive value computed using the luminance value, the global luminance adaptive value and the luminance adaptive value corresponds to a value related to luminance of each pixel, i.e. a value that the human vision mechanism responding to brightness is reflected. Thus, the image information of each pixel is converted using a ratio value of the image information of each pixel to the light adaptive value, so that the image information is generated appropriate for the human vision mechanism.

And, to reflect the human vision mechanism more delicately, the converted value of the image information of each pixel may be computed by the following Equation 6.

$$\left( \frac{I_{r/g/b}}{a + I_{r/g/b} + (f(I_a))^m} \right)^{\frac{1}{gam}} \quad \text{Equation 6}$$

In the Equation 6, a is a constant equal to or greater than 0, $I_{r/g/b}$ is an image information of each pixel, gam is a gamma input constant, $I_a$ is the light adaptive value, f is a light adaptive value converting function, and m is a color distortion correcting input constant. In the case that normalized image information is used according to an embodiment of the present invention, the $I_{r/g/b}$ may means a normalized image information of each pixel.

The above Equation 6 is related to modelling a sensing type of the human eye, in particular the cones for discerning color in HVS (Human Vision System), and corresponds to equation for abstracting functionally an adaptation phenomenon of a photoreceptor.

The resulting value of the above Equation 6 corresponds to a conversion value of each pixel. In the Equation 6, the constant 'a' is a constant value for preventing the case that a denominator becomes 0. In the case that a value of another term corresponding to a denominator of the Equation 6 is equal to or greater than 0, the constant may be 0. And, it is possible to set the constant to a small number approximate to 0.

The constant 'gam' is generally used to correct a unique value in a physical equipment, and thus is determined according to application embodiment or usage environment. In the case that gamma correction is not necessary, the constant 'gam' may be set to 1.

The function f is a conversion function, and may be expressed as various functions, for example a function (f(x)=x), in which the light adaptive value is an independent variable and the independent variable is converted as it is to adjust the degree of conversion of the light adaptive value. Preferably, the function is incorporated into an exponential function, i.e. f(x)=exp(-x) to increase the width of image change ratio.

And, in the Equation 6, m is a correction constant for correcting color distortion, and may be inputted by a user or stored in an internal system and utilized according to embodiment. The constant is used to complement for distortion of a color information in the image information using a value between 0 and 1 to reduce a partial color distortion phenomenon.

That is, in the case that m is set to 1 and the conversion function is f(x)=exp(-x), the Equation 6 is represented as follows.

$$\left( \frac{I_{r/g/b}}{a + I_{r/g/b} + (e^{-I_a})^1} \right)^{\frac{1}{gam}} \quad \text{Equation 7}$$

After the converted value is computed, the denormalization unit 180 denormalizes the normalized image information (S260). Thus, a series of processes of a non-linear tone mapping method are completed.

As mentioned above, in the case that normalization is omitted, the denormalization is not necessary.

Figure 4:
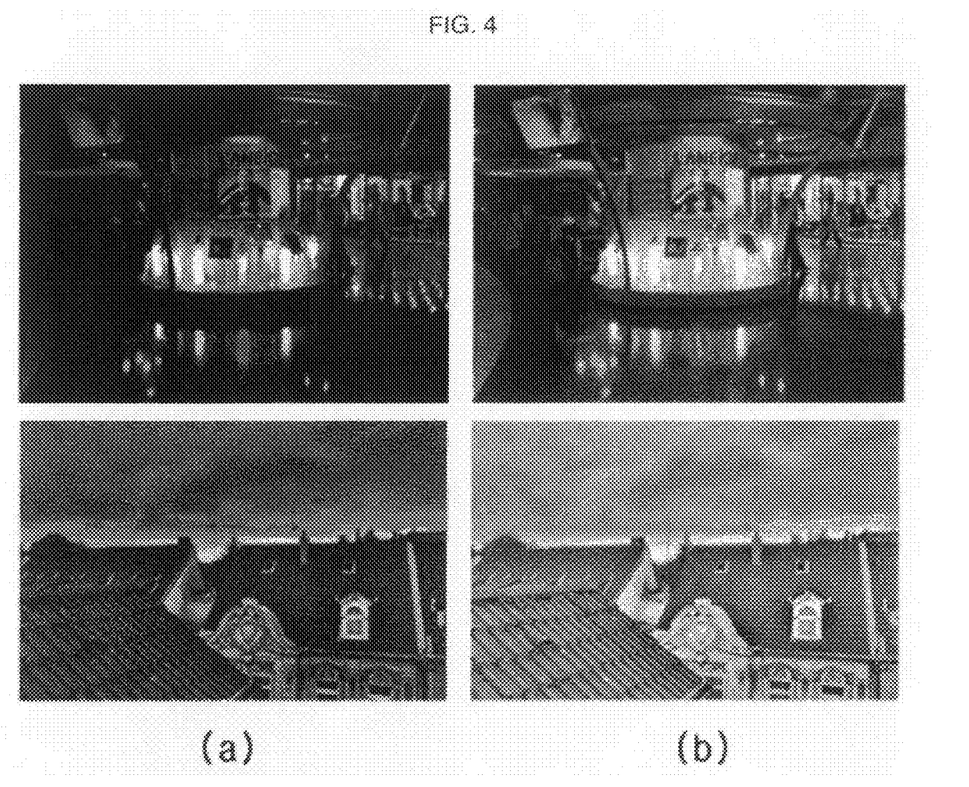
FIG. 4 is a view illustrating results of image information converted by the present invention.

FIG. 4 is a view illustrating the resultant image (b) converted by the present invention and the original object image (a). As shown in FIG. 4, naturalness of the whole color of the object image was maintained and a low luminous intensity area was corrected.

As such, a non-linear tone mapping apparatus according to the present invention was described in detail. However, it should be understood that each component of the non-linear tone mapping apparatus according to the present invention is not divided physically, but logically. That is, each component corresponds to a logic component for realizing the technical spirit of the present invention, and thus it should be interpreted that it is in the range of the present invention if a function performed by a logic configuration of the present invention is realized, although the component is operated integrally or separately.

The non-linear tone mapping method according to the present invention may be incorporated as a computer readable code in a computer readable medium. The computer readable medium includes all kinds of storage devices for storing data readable by a computer system. For example, the computer readable medium is ROM (Read Only Memory), RAM (Random Access Memory), CD-ROM (Compact Disc Read Only Memory), a magnetic tape, a floppy disc or an optical data storage device, and may be incorporated in the form of a carrier wave (for example, transmission via the Internet). And, the computer readable medium may store and execute a code that is dispersed in computer systems connected to each other via a network and is readable by a computer through a dispersion method. Further, function program, code and code segments for implementing the non-linear tone mapping method may be easily inferred by programmers in the prior art.

Only a few implementations and examples are described and other implementations, enhancements and variations can be made based on what is described and illustrated in this application.

The non-linear tone mapping apparatus and method according to the present invention reflects the human vision system on image processing, thereby correcting a low luminous intensity area without the whole color change.

And, the present invention allows a natural gradation from a low luminous intensity to a high luminous intensity, thereby overcoming an artificial and compulsory image processing.

That is, the present invention overcomes the situation that it is difficult to discern an object in the case that the object is taken by an image obtaining device in a dark place or the object located at a shaded area is taken by an image obtaining device even in a bright place, and is additionally applied to a general AE (Auto Exposure), thereby providing an easier image obtaining method.

What is claimed is:

1. A non-linear tone mapping apparatus, comprising:
a normalization unit configured to normalize an image information of each pixel of an object image;
a luminance value computing unit configured to compute a luminance value of each pixel of the object image using the normalized image information of each pixel inputted from the normalization unit, wherein the operation of the luminance value computing unit follows the operation of the normalization unit;
a computing unit configured to compute a light adaptive value of each pixel using the image information and the computed luminance value of each pixel, where the light adaptive value represents each pixel's degree of response to brightness of the image, wherein the computing unit comprises a luminance adaptive value computing unit for computing a luminance adaptive value of each pixel using the image information of each pixel and the luminance value of each pixel;
a converting unit configured to convert the image information of each pixel using the image information of each pixel and the light adaptive value of each pixel; and
a denormalization unit configured to denormalize the image information of each pixel converted by the converting unit,
wherein the luminance value computing unit computes the luminance value using the image information of each pixel normalized by the normalization unit, wherein the luminance adaptive value computing unit computes the luminance adaptive value using a first value and a second value, wherein the first value is the product of applying a first weight to the normalized image information of each pixel, and the second value is the product of applying a second weight to the luminance value of each pixel, and wherein a sum of the first weight and the second weight is 1.

2. The non-linear tone mapping apparatus according to claim 1, wherein the computing unit comprises:
a global luminance adaptive value computing unit for computing a global luminance adaptive value of the object image using a statistical computation value of the image information and a statistical computation value of the luminance values; and
a light adaptive value computing unit for computing the light adaptive value corresponding to the image information of each pixel using the luminance adaptive value of each pixel and the global luminance adaptive value.

3. The non-linear tone mapping apparatus according to claim 2,
wherein the statistical computation value of the image information is an average value of the image information, and the statistical computation value of the luminance value is an average value of the luminance values.

4. The non-linear tone mapping apparatus according to claim 1,
wherein the global luminance adaptive value computing unit computes the global luminance adaptive value using a third value and a fourth value,
where the third value is the product of applying a third weight to the statistical computation value of the normalized image information of each pixel, and the fourth value is the product of applying a fourth weight to the statistical computation value of the luminance value of each pixel,
where a sum of the third weight and the fourth weight is 1.

5. The non-linear tone mapping apparatus according to claim 1
wherein the light adaptive value computing unit computes the light adaptive value using a fifth value and a sixth value,
where the fifth value is the product of applying a fifth weight to the luminance adaptive value of each pixel, and the sixth value is the product of applying a sixth weight to the global luminance adaptive value,
where a sum of the fifth weight and the sixth weight is 1.

6. The non-linear tone mapping apparatus according to claim 1,
wherein the converting unit converts the image information of each pixel using a value obtained by applying gamma correction to a ratio of the image information and a denominator value,
where the denominator value is calculated using a function result value and the image information,
where the function result value is obtained by applying a conversion function to the light adaptive value,
where the conversion function is capable of adjusting a degree of conversion of the light adaptive value.

7. The non-linear tone mapping apparatus according to claim 6, wherein the function result value is a value obtained by using an exponential function of the light adaptive value and a correction constant.

8. The non-linear tone mapping apparatus according to claim 6,
wherein the conversion function is an exponential function.

9. A non-linear tone mapping method, comprising:
a normalization step of normalizing an image information of each pixel of an object image;
a luminance value computing step of computing a luminance value of each pixel of the object image using an image information normalized in the normalization step, wherein the luminance value computing step follows the normalization step;
a light adaptive value computing step of computing a light adaptive value of each pixel using the image information and luminance value of each pixel, where the light adaptive value represents each pixel's degree of response to brightness of the image, wherein the light adaptive value computing step comprises a luminance adaptive value computing step of computing a luminance adaptive value of each pixel using the image information of each pixel and the luminance value of each pixel;
a converting step of converting the image information of each pixel using the image information of each pixel and the light adaptive value of each pixel; and
a denormalization step of denormalizing the image information of each pixel converted in the converting step,
wherein the luminance value computing step computes the luminance value using the image information of each pixel normalized in the normalization step,
wherein the luminance adaptive value computing step computes the luminance adaptive value using a first value and a second value, wherein the first value is the product of applying a first weight to the normalized image information of each pixel, and the second value is the product of applying a second weight to the luminance value of each pixel, and wherein a sum of the first weight and the second weight is 1.

10. The non-linear tone mapping method according to claim 9, wherein the light adaptive value computing step comprises:
a global luminance adaptive value computing step of computing a global luminance adaptive value of the object image using a statistical computation value of the image information and a statistical computation value of the luminance values; and
a light adaptive value computing step of computing the light adaptive value corresponding to the image information of each pixel using the luminance adaptive value of each pixel and the global luminance adaptive value.

11. The non-linear tone mapping method according to claim 10,
wherein the statistical computation value of the image information is an average value of the image information, and the statistical computation value of the luminance value is an average value of the luminance values.

12. The non-linear tone mapping method according to claim 9,
wherein the global luminance adaptive value computing step computes the global luminance adaptive value using a third value and a fourth value,
where the third value is the product of applying a third weight to the statistical computation value of the normalized image information of each pixel, and the fourth value is the product of applying a fourth weight to the statistical computation value of the luminance value of each pixel,
where a sum of the third weight and the fourth weight is 1.

13. The non-linear tone mapping method according to claim 9,
wherein the light adaptive value computing step computes the light adaptive value using a fifth value and a sixth value, where the fifth value is the product of applying a fifth weight to the luminance adaptive value of each pixel, and the sixth value is the product of applying a sixth weight to the global luminance adaptive value, where a sum of the fifth weight and the sixth weight is 1.

14. The non-linear tone mapping method according to claim 9, wherein the converting step converts the image information of each pixel using a value obtained by applying gamma correction to a ratio of the image information and a denominator value, where the denominator value is calculated using a function result value and the image information, where the function result value is obtained by applying a conversion function to the light adaptive value, where the conversion function is capable of adjusting a degree of conversion of the light adaptive value.

15. The non-linear tone mapping method according to claim 14, wherein the function result value is a value obtained by using an exponential function of the light adaptive value and a correction constant.

16. The non-linear tone mapping method according to claim 14, wherein the conversion function is an exponential function.

17. A non-transitory computer readable medium, having computer executable instructions stored thereon for performing the non-linear tone mapping method defined in claim 9.

* * * * *